(12) United States Patent  
Yun et al.

(10) Patent No.: US 9,612,362 B2  
(45) Date of Patent: Apr. 4, 2017

(54) THIN ACTIVE OPTICAL ZOOM LENS AND APPARATUS USING THE SAME

(71) Applicant: ELECTRONICS AND TELECOMMUNICATIONS RESEARCH INSTITUTE, Daejeon (KR)

(72) Inventors: Sung Ryul Yun, Daejeon (KR); Ki Uk Kyung, Daejeon (KR); Sun Tak Park, Incheon (KR); Sae Kwang Nam, Daejeon (KR); Bong Je Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/007,139

(22) Filed: Jan. 26, 2016

(65) Prior Publication Data

US 2016/0216492 A1    Jul. 28, 2016

(30) Foreign Application Priority Data

Jan. 27, 2015   (KR) .................. 10-2015-0012893  
Oct. 20, 2015   (KR) .................. 10-2015-0146146

(51) Int. Cl.  
*G02B 15/14* (2006.01)  
*G02B 7/02* (2006.01)  
(Continued)

(52) U.S. Cl.  
CPC ........... *G02B 1/041* (2013.01); *G02B 3/0081* (2013.01); *G02B 3/14* (2013.01); *G02B 7/102* (2013.01);  
(Continued)

(58) Field of Classification Search  
CPC ........ G02B 1/041; G02B 1/06; G02B 3/0081; G02B 3/14; G02B 7/02; G02B 7/021;  
(Continued)

(56) References Cited

U.S. PATENT DOCUMENTS 7,068,930 B2 *   6/2006   McKevitt ............... G02B 7/023  
                                                  348/E5.028  
7,359,124 B1 *   4/2008   Fang ....................... G02B 1/06  
                                                  359/665

(Continued)

FOREIGN PATENT DOCUMENTS

KR   10-2006-0023772 A    3/2006  
KR   10-2006-0103059 A    9/2006  
KR   10-2010-0037950 A    4/2010

OTHER PUBLICATIONS

Sungryul Yun et al., "A thin film active-lens with translational control for dynamically programmable optical zoom", Applied Physics Letters 107, 081907, Aug. 28, 2015.

*Primary Examiner* — Loha Ben  
(74) *Attorney, Agent, or Firm* — Rabin & Berdo, P.C.

(57) ABSTRACT

Provided herein are an optical zoom lens capable of actively zooming in and/or out and an apparatus using the same. The optical zoom lens may include an electro-active polymer layer configured to be deformable in response to an electric signal; a lens structure formed over the electro-active polymer layer; a first electrode formed on an upper surface of the electro-active polymer layer; a second electrode formed on a lower surface of the electro-active polymer layer; and a control circuit unit configured to apply a voltage to the first electrode and the second electrode. The optical zoom lens, having a structure of a combination of the polymer lens structure and the electro-active polymer actuator, is able to embody active variation in position of the polymer lens (Continued)

structure body and control therefor using deformation of the electro-active polymer layer by an electric signal.

15 Claims, 7 Drawing Sheets

(51) Int. Cl.
*G03B 13/00* (2006.01)
*H04N 5/232* (2006.01)
*G02B 1/04* (2006.01)
*G02B 3/00* (2006.01)
*G02B 3/14* (2006.01)
*G02B 13/00* (2006.01)
*G02C 7/08* (2006.01)
*G02B 7/10* (2006.01)
*G03B 5/00* (2006.01)
*H04N 5/225* (2006.01)

(52) U.S. Cl.
CPC ....... *G02B 13/009* (2013.01); *G02B 13/0075* (2013.01); *G02B 15/14* (2013.01); *G02C 7/083* (2013.01); *G03B 5/00* (2013.01); *H04N 5/23212* (2013.01); *G02B 7/021* (2013.01); *G03B 13/00* (2013.01); *G03B 2205/0046* (2013.01); *G03B 2205/0084* (2013.01); *H04N 5/2254* (2013.01)

(58) Field of Classification Search
CPC . G02B 7/09; G02B 7/10; G02B 7/102; G02B 7/36; G02B 13/0075; G02B 13/0081; G02B 15/00; G02B 15/14; G02B 26/08; G02B 26/0825; G03B 5/00; G03B 13/00; G03B 2205/0046; G03B 2205/0084; G02C 7/02; G02C 7/083; H04N 5/2254; H04N 5/232; H04N 5/23212; H04N 5/2353
USPC ....... 359/694–696, 811, 814, 823, 824, 721; 348/345; 235/470, 472.01
See application file for complete search history.

(56) References Cited

U.S. PATENT DOCUMENTS

| | | | | |
|---|---|---|---|---|
| 7,813,047 | B2* | 10/2010 | Wang | G02B 3/14 359/665 |
| 8,038,066 | B2* | 10/2011 | Havens | G02B 3/14 235/462.15 |
| 8,064,142 | B2* | 11/2011 | Batchko | G02B 3/14 359/665 |
| 8,505,822 | B2* | 8/2013 | Wang | G02B 3/14 235/380 |
| 9,207,367 | B2* | 12/2015 | Wang | G02B 3/14 |
| 9,253,387 | B2* | 2/2016 | Furusawa | G03B 3/04 |
| 9,351,827 | B2* | 5/2016 | Toner | G02C 7/04 |
| 2006/0214520 | A1 | 9/2006 | Tseng | |
| 2009/0147377 | A1 | 6/2009 | Polyakov et al. | |
| 2009/0161239 | A1 | 6/2009 | Verhaar et al. | |
| 2014/0085865 | A1 | 3/2014 | Yun et al. | |
| 2015/0043067 | A1 | 2/2015 | Yun et al. | |
| 2015/0205096 | A1* | 7/2015 | Nam | G02B 3/14 359/291 |
| 2016/0266376 | A1* | 9/2016 | Nam | G02B 26/0825 |

* cited by examiner

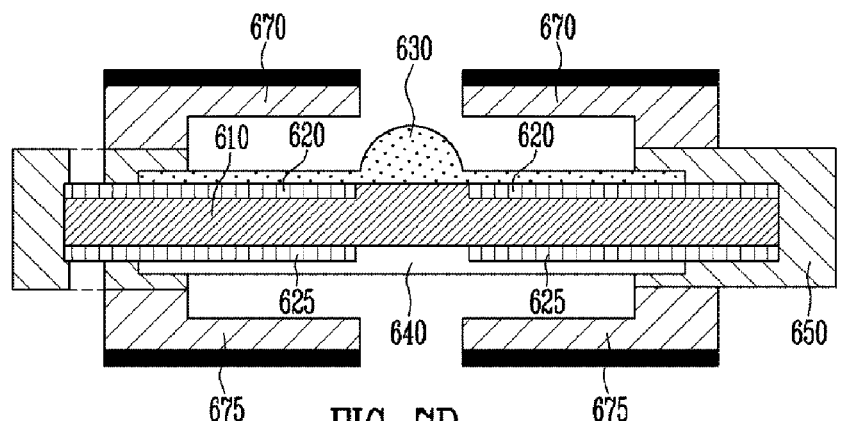
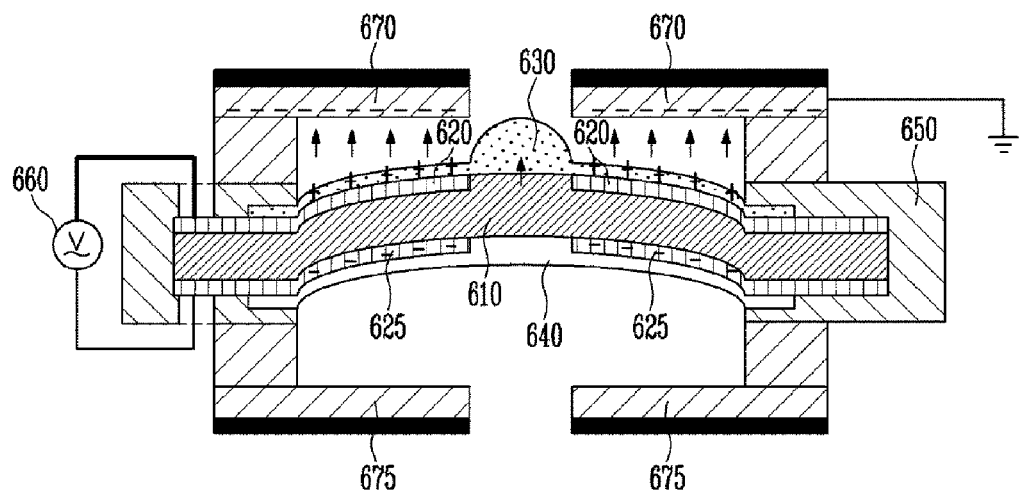
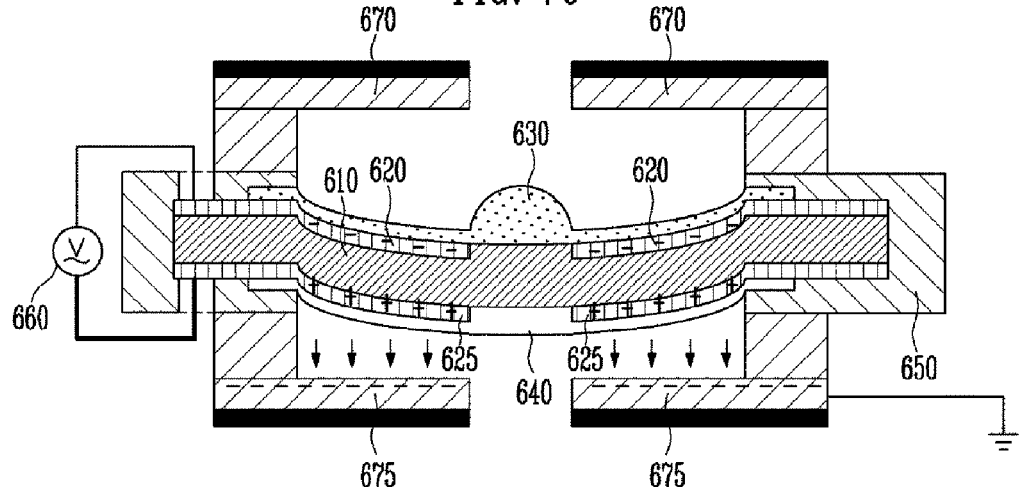

THIN ACTIVE OPTICAL ZOOM LENS AND APPARATUS USING THE SAME

CROSS-REFERENCE TO RELATED APPLICATION

The present application claims priority to Korean Patent Application Numbers 10-2015-0012893 filed on Jan. 27, 2015 and 10-2015-0146146 filed on Oct. 20, 2015, in the Korean Intellectual Property Office, the entire disclosure of which is incorporated by reference herein.

BACKGROUND

Field of Invention

Various embodiments of the present disclosure relate to a thin optical lens capable of actively zooming in and/or out and an apparatus using the same, and more particularly, to a thin optical lens capable of adjusting the position of a lens structure using deformation of a transparent thin polymer film having high elasticity, without interlocking with a separate external drive unit for changing the position of the lens, and to an optical apparatus using the same.

Description of Related Art

Recently, for cameras, potable terminals, TVs, projectors, medical devices, etc. that are based on the digital technology, a reduction in thickness and weight of optical systems pertaining to high-resolution imaging is required as the display technology is developed. For this, the importance of a reduction in size of an optical zoom apparatus is being further emphasized.

To embody an optical zoom function in a camera module, a technique using a separate actuator to vary the position of a lens may be used. A step motor may be used as a method for embodying the optical zoom function. In this case, a movable unit may be linearly moved by rotating a lead screw using a drive unit which generates rotational motion. However, in such a method, complex mechanism is required. Furthermore, friction is generated in a gear unit, whereby noise may be caused.

To provide an automatic zoom function, a method of using a voice coil motor (VCM) or a piezoelectric ceramic actuator may be used. The method of using the VCM is a method in which electromagnetic force by a magnet and current flowing through a coil is used to generate drive force for embodying the automatic zoom function. However, electromagnetic waves are generated, and the precision is limited. The method of using the piezoelectric ceramic actuator is a method in which friction between a stator and a rotor is used to generate drive force for embodying the automatic zoom function. However, there are disadvantages in that the lifetime is reduced by abrasion, and the production cost is comparatively high.

Most of the existing techniques such as the above-mentioned examples have complex structures resulting in an increase in the production cost. In addition, it is difficult to reduce the size, so that a reduction in thickness and weight of an optical zoom apparatus is limited.

SUMMARY

Various embodiments of the present disclosure are directed to a thin active optical zoom lens technique which has a structure of a combination of a polymer lens structure body and an electro-active polymer actuator, and is able to embody active variation in position of the polymer lens structure body and control therefor using deformation of an electro-active polymer layer by an electric signal.

Furthermore, various embodiments of the present disclosure are directed to a lens structure capable of embodying a zoom in/out function without interlocking with a separate linear drive unit.

Various embodiments of the present disclosure are directed to an optical zoom lens configured such that the position of a lens structure body is actively changed by controlling an electric signal applied to a thin electro-active polymer layer, and an optical system based on the same.

Various embodiments of the present disclosure are directed to an actively controllable thin optical zoom module which may be installed in an apparatus such as a camera, a portable terminal, a projector, a TV or the like, thus making it possible to reduce the thickness and weight of the apparatus.

Various embodiments of the present disclosure are directed to a thin active optical zoom lens which may be used in an optical system for various optical apparatuses such as an optical property measurement apparatus or an optical imaging apparatus, e.g., a confocal microscope.

Various embodiments of the present disclosure are directed to a technique capable of obtaining a high-resolution image, using an active optical zoom function and its feedback control, in a medical imaging test using a medical imaging apparatus, e.g., an endoscope, thereby making it possible to enhance the accuracy of diagnosis of a disease.

The objects of the present disclosure are not limited to the above-mentioned objects, and those skilled in this art will be able to easily understand other unmentioned objects from the following description.

One embodiment of the present disclosure provides an optical zoom lens including: an electro-active polymer layer configured to be deformable in response to an electric signal; a lens structure formed over the electro-active polymer layer; a first electrode formed on an upper surface of the electro-active polymer layer; a second electrode formed on a lower surface of the electro-active polymer layer; and a control circuit unit configured to control application of a voltage to the first electrode and the second electrode.

The optical zoom lens may further include: an insulator formed below the second electrode; and a support structure provided on an outer edge of the electro-active polymer layer.

The electro-active polymer layer and the lens structure may be integrally formed into a single body without a thin film layer formed over the electro-active polymer.

The first electrode and the second electrode may be respectively formed on only portions of the upper and lower surfaces of the electro-active polymer layer.

The electro-active polymer layer may include an electro-active material having reversible deformation response characteristics to an electric signal.

The insulator may be made of the same kind of material as that of the electro-active polymer layer or a material having stiffness lower than the electro-active polymer layer.

The control circuit unit may receive a feedback on whether focusing has been succeeded as the electro-active polymer layer is deformed in response to an applied voltage. The control circuit unit may change or maintain the magnitude of the applied voltage using the received feedback information so as to control the focusing.

The lens structure may include a dielectric polymer material.

The first electrode may be applied with a positive (+) voltage, and the second electrode may be grounded or applied with a different magnitude of voltage.

The optical zoom lens may further include: an upper thin film layer formed over the first electrode at a position spaced apart from the first electrode; and a lower thin film layer formed below the second electrode at a position spaced apart from the second electrode, and wherein at least either the upper thin film layer or the lower thin film layer may include a thin film layer electrode.

When the first electrode is applied with a positive (+) voltage and the second electrode is grounded, the upper thin film layer may be grounded.

The lens structure may include a lens region, and a thin film layer formed over the electro-active polymer layer, and the first electrode may be formed between the electro-active polymer layer and the thin film layer.

Another embodiment of the present disclosure provides an optical apparatus including: at least two optical zoom lenses; and a charge coupled device (CCD), wherein each of the at least two optical zoom lenses may include: an electro-active polymer layer configured to be deformable in response to an electric signal; a lens structure formed over the electro-active polymer layer; a first electrode formed on an upper surface of the electro-active polymer layer; a second electrode formed on a lower surface of the electro-active polymer layer; and a control circuit unit configured to apply a voltage to the first electrode and the second electrode.

The at least two optical zoom lenses may further include: a first optical zoom lens including a convex-lens-shaped lens structure; and a second optical zoom lens including a concave-lens-shaped lens structure.

Each of the at least two optical zoom lenses may further include: an upper thin film layer formed over the first electrode at a position spaced apart from the first electrode; and a lower thin film layer formed below the second electrode at a position spaced apart from the second electrode, and wherein at least either the upper thin film layer or the lower thin film layer may include a thin film layer electrode.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7A, FIG. 7B and FIG. 7C are views illustrating another example of the thin active optical zoom lens according to the first embodiment of the present disclosure;

DETAILED DESCRIPTION

Figure 1:
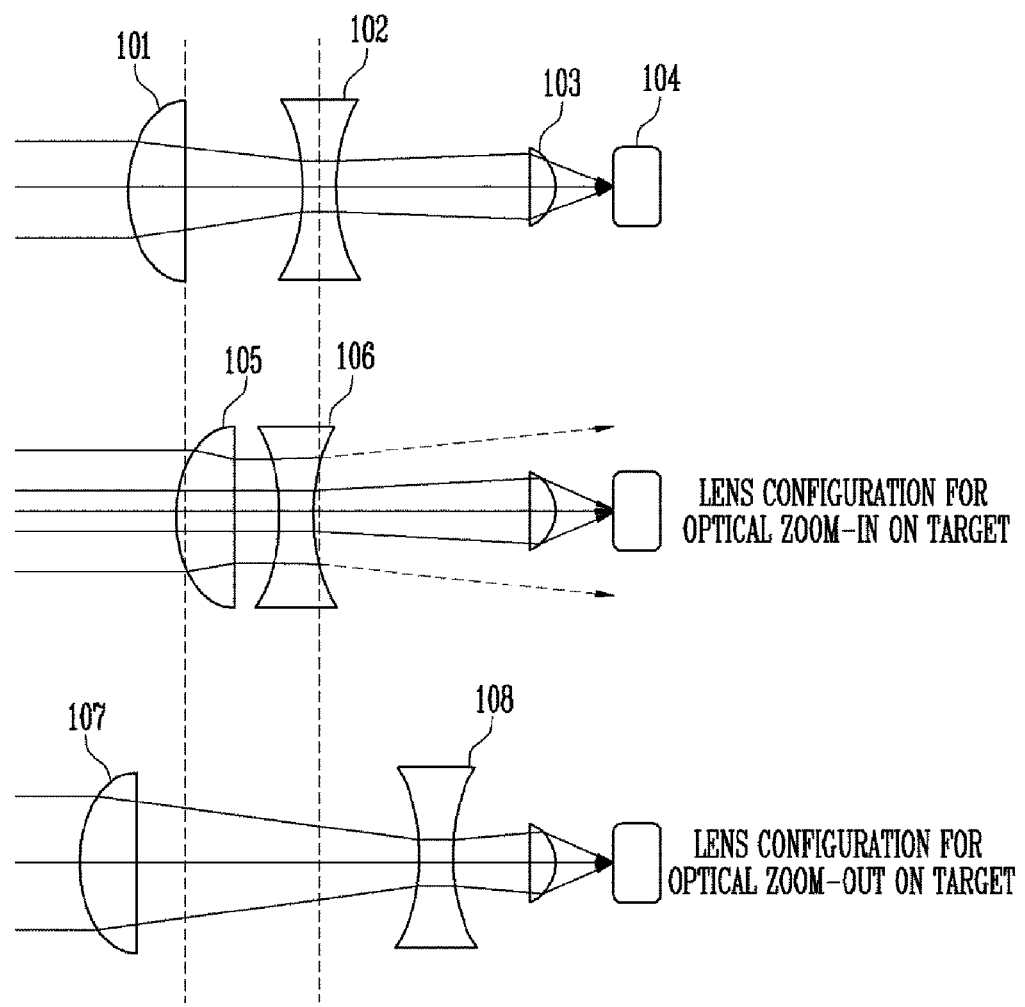
FIG. 1 is a view illustrating an example of realization of thin active lens based zoom in and/or out according to an embodiment of the present disclosure.

Hereinafter, an exemplary embodiment of the present disclosure will be described in detail with reference to the attached drawings.

Detailed description of functions and structures well known to those skilled in the art will be omitted to avoid obscuring the subject matter of the present disclosure. This aims to omit unnecessary description so as to make the subject matter of the present disclosure clear.

If in the specification, detailed descriptions of well-known functions or configurations would unnecessarily obfuscate the gist of the present disclosure, the detailed descriptions will be omitted. Hereinafter, exemplary embodiments of the present disclosure will be described in detail with reference to the attached drawings. The terms and words used for elements in the description of the present disclosure are defined based on the functions of the elements in the present disclosure. The terms and words may be changed depending on the intention or custom of users or operators, so that they must be defined based on the whole content of the present specification.

An embodiment of the present disclosure relates to a thin optical lens capable of actively zooming in and/or out, and an apparatus using the same. The thin optical lens according to the embodiment of the present disclosure is configured such that the position of a lens structure is adjusted depending on the purpose using deformation of a transparent thin polymer film having high elasticity, without interlocking with a separate external drive unit for changing the position of the lens. Hence, according to the present disclosure, a lens having an active optical zoom function with a small slim structure may be provided. Use of the optical zoom lens according to the embodiment of the present disclosure makes it possible to embody an optical system for optical zoom/automatic focusing, and an optical system for various optical apparatuses such as an endoscope and a confocal microscope.

In the case where a thin optical lens according to an embodiment of the present disclosure is applied to a camera, it is possible to selectively vary the position of the lens structure depending on the location of a target when capturing an image and to provide feedback control thereof using a thin structure, thus making it possible to reduce the thickness and weight of a camera structure for zoom in/out. Furthermore, in the case where a thin optical lens according to an embodiment of the present disclosure is applied to a medical device, e.g., an endoscope, it is possible to obtain a high resolution image using an active drive function, whereby the accuracy of disease diagnosis may be improved.

A thin variable lens for embodying active optical zoom according to an embodiment of the present disclosure may include a thin electro-active polymer drive unit, a drive lens structure, a signal control unit, an insulator for preventing discharge due to an applied voltage, and so on. Controlling the operation of the drive unit may be realized by controlling signals applied to electrodes. Depending on purpose of use, the purpose may be achieved by a combination with an optical device technology.

Hereinafter, embodiments of the present disclosure will be described in more detail.

FIG. 1 is a view illustrating an example of realization of thin active lens based zoom in and/or out according to an embodiment of the present disclosure.

A thin active lens based optical zoom function according to an embodiment of the present disclosure may be embodied by an optical system having a successive arrangement of an active lens, which is formed by a combination of at least one lens structure having a convex lens shape or a concave lens shape and a thin electro-active polymer layer, and a fixed focus lens. A combination of a convex-lens-shaped active lens and a concave-lens-shaped active lens may be effective for embodying an optical zoom function. In this case, each active lens may have a structure in which a convex-lens-shaped or concave-lens-shaped lens structure is coupled with an electro-active polymer layer, and may be configured such that variation in position of the polymer lens structure and control thereof can be embodied using deformation of the electro-active polymer layer caused by application of a voltage.

Referring to FIG. 1, a configuration for embodying a thin active lens based active optical zoom according to an embodiment of the present disclosure may include a convex-lens-shaped active lens 101, a concave lens shaped active lens 102, a fixed focus lens 103, and a CCD (charge coupled device) 104.

As shown in FIG. 1, in the configuration for embodying the thin active lens based active optical zoom according to the embodiment of the present disclosure, each of the convex-lens-shaped active lens 101 and the concave lens shaped active lens 102 may be deformed by application of a voltage, and thus the active lenses 101 and 102 may be disposed adjacent to or away from each other.

When the convex-lens-shaped active lens 101 and the concave lens shaped active lens 102 are moved to positions adjacent to each other like a convex-lens-shaped active lens 105 and a concave lens shaped active lens 106, an image of a target may be zoomed in on the CCD 104. Furthermore, when the active lenses 101 and 102 are moved away from each other like a convex-lens-shaped active lens 107 and a concave lens shaped active lens 108, zoom out may be embodied.

Figure 2:
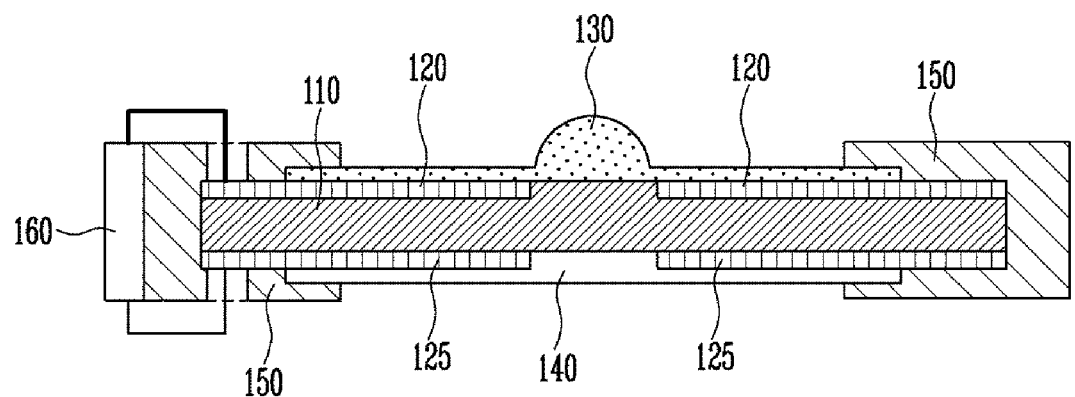
FIG. 2 is a sectional view illustrating an example of the configuration of a thin active lens for realizing optical zoom according to a first embodiment of the present disclosure.
Figure 3:
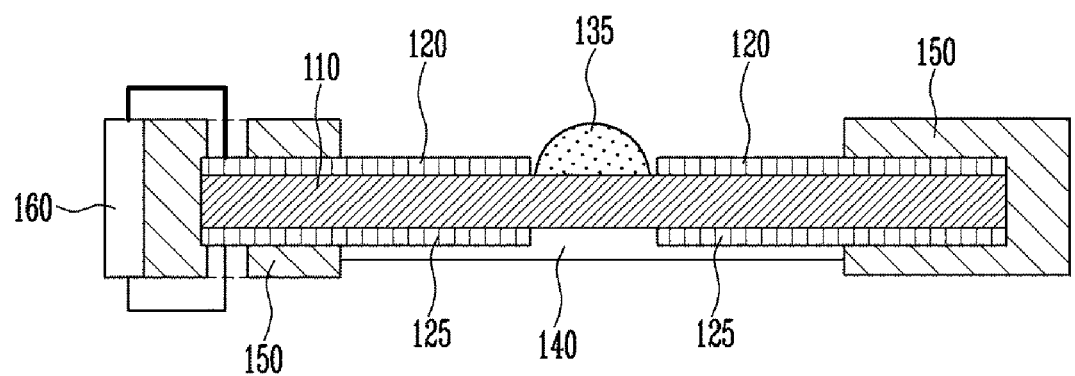
FIG. 3 is a sectional view illustrating an example of the configuration of a thin active lens for realizing optical zoom according to a second embodiment of the present disclosure.

FIG. 2 is a sectional view illustrating an example of the configuration of a thin active lens for realizing optical zoom according to a first embodiment of the present disclosure. FIG. 3 is a sectional view illustrating an example of the configuration of a thin active lens for realizing optical zoom according to a second embodiment of the present disclosure.

A thin active optical zoom lens according to an embodiment of the present disclosure may include a structure in which a polymer lens structure and a thin electro-active polymer layer are coupled with each other. In the present embodiment, variation in position of the active polymer lens structure and the control thereof may be realized using deformation of the lens structure caused by application of an electric signal to the thin electro-active polymer layer.

Referring to FIG. 2, the thin active optical zoom lens according to the first embodiment of the present disclosure may include an electro-active polymer operation unit 110, (flexible) electrodes 120 and 125, and a polymer lens structure 130. The thin active optical zoom lens may further include an insulator 140, a support structure 150, a drive control circuit unit 160, etc.

The electro-active polymer operation unit 110 may be formed of electro-active polymer material and be deformed by application of a voltage thereto. The term "electro-active polymer operation unit" is only for the sake of explanation and means that it is made of electro-active polymer material and can be deformed by application of a voltage thereto. Therefore, the term "electro-active polymer operation unit" may be used interchangeably with the term "electro-active polymer layer", "thin electro-active polymer layer", etc.

The flexible electrodes 120 and 125 may be provided to drive the electro-active polymer layer 110 and respectively formed on upper and lower surfaces of the electro-active polymer layer 110. The first flexible electrode 120 that is disposed on the upper surface of the electro-active polymer layer 110 may be applied with a positive (+) voltage, and the second flexible electrode 125 that is disposed on the lower surface of the electro-active polymer layer 110 may be grounded or applied with a different magnitude of voltage (and vice-versa). Depending on the magnitude of voltage applied to the flexible electrodes 120 and 125, the degree to which the electro-active polymer layer 110 is deformed may be adjusted. This will be described in detail later herein. In some embodiments, as shown in FIG. 2, the first flexible electrode 120 and the second flexible electrode 125 may be formed on only portions of the upper and lower surfaces of the electro-active polymer layer 110. For example, the flexible electrodes 120 and 125 may be formed on portions of the upper and lower surfaces of the electro-active polymer layer 110 other than a portion corresponding to a convex lens region of the polymer lens structure 130 that is disposed over the electro-active polymer layer 110.

The polymer lens structure 130 may be disposed over the electro-active polymer layer 110. The first flexible electrode 120 may be disposed between the polymer lens structure 130 and the electro-active polymer layer 110. That is, as shown in FIG. 2, the polymer lens structure 130 may be configured to have a thin film layer that is formed over a portion of the elective active polymer layer 110 other than the portion corresponding to the convex lens region. The first flexible electrode 120 may be disposed between the thin film layer of the polymer lens structure 130 and the electro-active polymer layer 110.

In some embodiments, the first flexible electrode 120 may not be present between the convex lens region of the polymer lens structure 130 and the electro-active polymer layer 110. In some embodiments, the polymer lens structure 130 may be disposed on a central portion of the upper surface of the electro-active polymer layer 110. The polymer lens structure 130 may vertically vary in position depending on deformation of the electro-active polymer operation unit 110 caused by application of a voltage to the operation unit 110. This will be described in detail later herein. The term "polymer lens structure" is only for the sake of explanation and may be used interchangeably with the term "lens structure body", "lens structure", "polymer lens structure body", etc.

The insulator (or an insulation layer) 140 may be provided to prevent electric leakage of the flexible electrodes 120 and 125. Furthermore, the (polymer lens) support structure 150 may be disposed on an outer edge of the electro-active polymer layer 110 so as to support the thin active optical zoom lens. The drive control circuit unit 160 may be provided to control the operation of the electro-active polymer operation unit 110. When the position of the lens structure body 130 is varied by applying an electric signal to the electro-active polymer operation unit 110, precise feedback control interlocking with the drive control circuit unit 160 may be possible. Thereby, a high resolution image of the target may be obtained. The drive control circuit unit 160 may function to control voltages applied to the electro-active polymer operation unit 110. The drive control circuit unit 160 may receive a feedback on whether focusing has been succeeded as the position of the lens structure body 130 is changed by deformation of the electro-active polymer operation unit 110 caused by application of a voltage. The drive control circuit unit 160 may use received feedback information and control, that is, increase, reduce, or maintain, the voltage applied to the electro-active polymer operation unit 110 so as to focus on the target.

Referring to FIG. 3, the thin active optical zoom lens according to the second embodiment of the present disclosure may include an electro-active polymer operation unit 110, (flexible) electrodes 120 and 125, and a polymer lens structure 135. The thin active optical zoom lens may further include an insulator 140, a support structure 150, a drive control circuit unit 160, etc.

Unlike the thin active optical zoom lens illustrated in FIG. 2, the polymer lens structure 135 may be integrally formed with the electro-active polymer layer 110 to form a lens region using the same material, rather than having a structure with a thin film layer formed over the electro-active polymer layer 110. The first flexible electrode 120 and the second flexible electrode 125 may be respectively formed on portions of the upper and lower surfaces of the electro-active polymer layer 110 other than a portion corresponding to the convex lens region.

The configuration of the other components is the same as that of the thin active optical zoom lens illustrated in the description of FIG. 2; therefore, detailed explanation will be omitted.

Figure 4A:
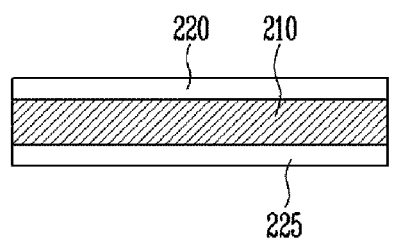
FIG. 4A and FIG. 4B are views showing an example of deformation of an electro-active polymer layer caused by application of a voltage according to an embodiment of the present disclosure.
Figure 4B:
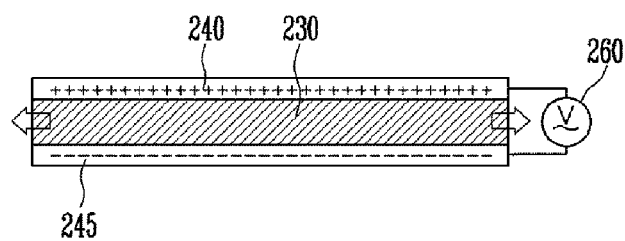

FIG. 4A and FIG. 4B are views showing an example of deformation of an electro-active polymer layer caused by application of a voltage according to an embodiment of the present disclosure.

Referring to FIG. 4A, a drive unit according to an embodiment of the present disclosure may include an electro-active polymer layer 210 and electrodes 220 and 225. The first electrode 220 may be formed on an upper surface of the electro-active polymer layer 210, and the second electrode 225 may be formed on a lower surface thereof.

As shown in FIG. 4B, a voltage may be applied to the electro-active polymer layer 230 in a thickness direction. In this case, as shown in the drawing, a control circuit unit 260 may apply a positive (+) voltage to the first electrode 240 and ground the second electrode 245. Thereby, the electro-active polymer layer 230 may be deformed to lengthen in a horizontal direction. That is, as shown in the drawing, compared to the electro-active polymer layer 210 of FIG. 4A that is prior to the application of the voltage, the electro-active polymer layer 230 of FIG. 4B to which the voltage has been applied may be deformed in the longitudinal direction thereof. In some embodiments, the electro-active polymer layer 230 may be deformed to lengthen in the longitudinal direction.

The electro-active polymer layer 210, 230 may be made of various kinds of materials having electro-active properties. The electro-active polymer may be material that causes mechanical deformation using migration and diffusion of ions, an array of dipoles or electrostatic force when a voltage is applied thereto. The electro-active polymer may refer to a kind of functional polymer, which generates electric energy when mechanical deformation is applied thereto.

In an example, the electro-active polymer may include an ionic EAP (electro-active polymer) or an electronic EAP.

The ionic EAP may refer to a polymer that is contracted or expanded by migration and diffusion of ions when a voltage is applied thereto. Furthermore, the ionic EAP may include at least one of electrorheological fluid (ERF), a carbon nanotube (CNT), a conducting polymer (CP), an ionic polymer metal composite (IPMC), and ionic polymer gel (IPG).

The electronic EAP may refer to a polymer that is contracted or expanded by electronic polarization when electric energy is applied thereto. Furthermore, the electronic EAP may include at least one of a liquid crystal elastomer (LCE), an electro-viscoelastic elastomer, a dielectric elastomer (DE), a ferroelectric polymer, an electrostrictive graft elastomer, and electrostrictive paper.

In another example, the electronic EAP may include a dielectric substance that transfer electrical polarity but does not transfer electrons.

As such, the EAP layer 210, 230 may be a dielectric EAP material which is flexible and elastic, has reversible deformation response characteristics to input of an electric signal, is low in current consumption, and is adjustable in degree of deformation depending on the magnitude of an applied voltage. Furthermore, the EAP layer 210, 230 may be material that has a large range of deformation caused by application of a voltage and is able to maintain high durability even repetitive deformation.

The EAP layer 210, 230 may be designed to be thin so that a drive voltage can be reduced while maintaining the range of deformation. However, to effectively shift the position of the lens structure body 130, the EAP layer 210, 230 may be made of dielectric material having a higher stiffness than that of the lens structure body 130.

The electrodes 220, 225, 240, and 245 for driving the EAP layer 210, 230 may be made of, for example, a nanomaterial-based electrode, or high-elastic electrode material such as ionic gel, etc., so that excellent electric conductivity and mechanical durability thereof can be maintained despite repetitive deformation of the EAP layer 210, 230. The nanomaterial-based elastic electrode may be embodied by a corrugated electrode (e.g., a herringbone structure) or net-structured electrode that is based on metal nanomaterial, grapheme, a carbon nanotube, and so forth. The material may be used as a conductive filler, and embodied based on a conductive composite material made by complexation of rubbers having high elasticity.

Figure 5A:
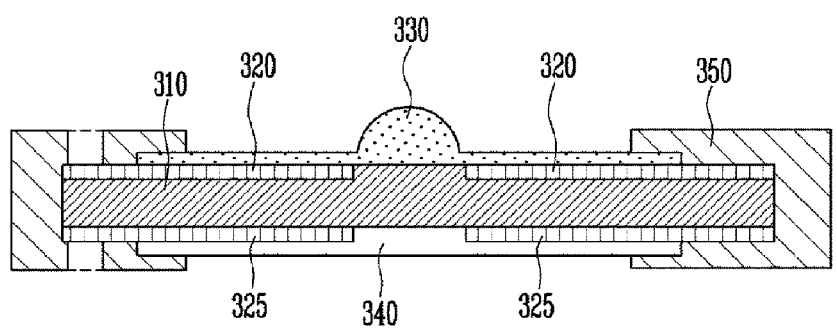
FIG. 5A and FIG. 5B are views illustrating an example of variation in position of a lens structure caused by deformation of an electro-active polymer layer according to the first embodiment of the present disclosure.
Figure 5B:
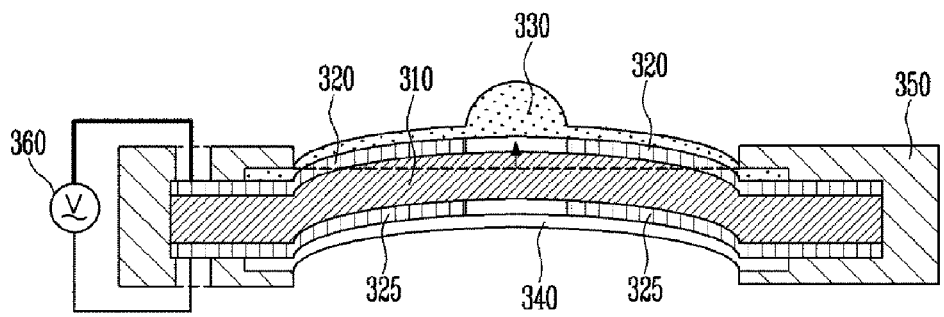
Figure 6A:
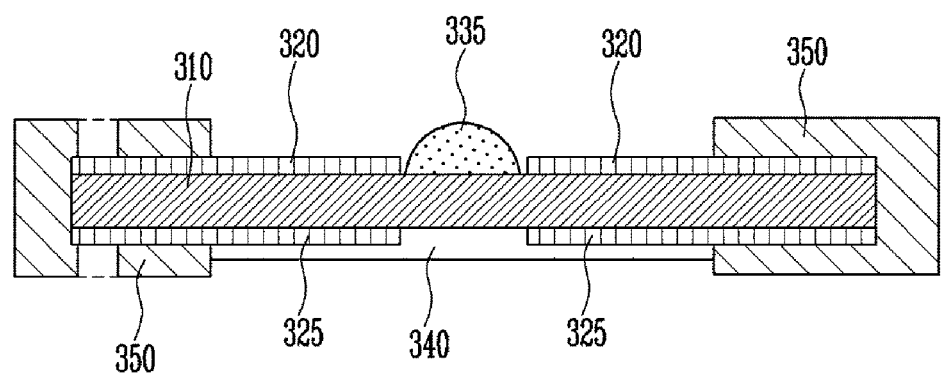
FIG. 6A and FIG. 6B are views illustrating an example of variation in position of a lens structure caused by deformation of an electro-active polymer layer according to the second embodiment of the present disclosure.
Figure 6B:
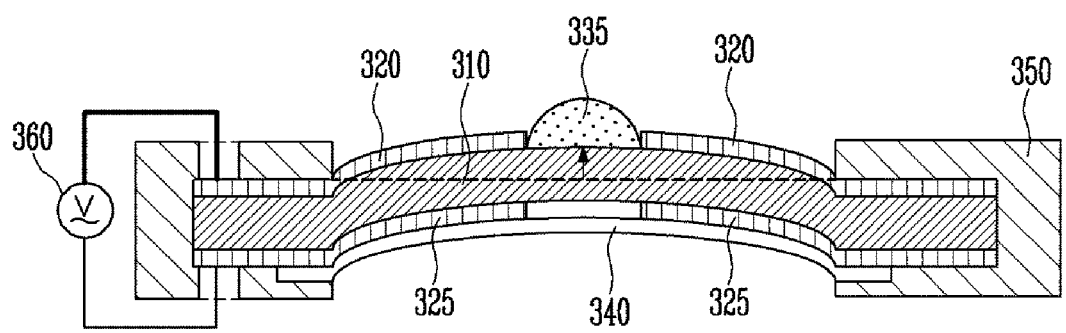

FIG. 5A and FIG. 5B are views illustrating an example of variation in position of a lens structure caused by deformation of an EAP layer according to the first embodiment of the present disclosure. FIG. 6A and FIG. 6B are views illustrating an example of variation in position of a lens structure caused by deformation of an EAP layer according to the second embodiment of the present disclosure.

Referring to FIGS. 5A, 5B, 6A and 6B, active position variation of the lens structure body 330, 335 may be induced, based on the drive of an EAP layer 310.

As shown in FIG. 5A, a thin active optical zoom lens according to the first embodiment of the present disclosure may include an EAP layer 310, a first electrode 320 and a second electrode 325 which are respectively disposed on upper and lower surfaces of the EAP layer 310, and a lens structure body 330 which is disposed over the EAP layer 310. An insulator (or an insulation layer) 340 may be disposed below the EAP layer 310 so as to prevent electric leakage of the electrodes 320 and 325. A support structure 350 may be disposed on an outer edge of the EAP layer 310 and function to support the thin active optical zoom lens. The lens structure body 330 may be configured to have a thin film layer that is formed over a portion of the EAP layer 310 other than a portion corresponding to a convex lens region.

As shown in FIG. 6A, in the case of a thin active optical zoom lens according to the second embodiment of the present disclosure, the lens structure body 335 may have a convex lens region without a thin film layer being formed over the EAP layer 310, and the lens region may be integrally formed on the EAP layer 310 using the same material.

As stated in the description of FIGS. 4A and 4B, a voltage may be applied to the EAP layer 310 in a thickness direction thereof through the electrodes 320 and 325 that are respectively disposed on the upper and lower surfaces of the (thin) EAP layer 310. The application of a voltage to the EAP layer 310 may be performed by a drive control circuit unit 360. In other words, the drive control circuit unit 360 may apply a preset voltage to the EAP layer 310 through the electrodes 320 and 325 so as to deform the EAP layer 310.

When a voltage is applied to the EAP layer 310, as shown in FIG. 5B, curved-surface deformation may be induced due to the support structure 350 provided on the outer edge of the EAP layer 310. In detail, when a voltage is applied to the EAP layer 310 in the thickness direction, the EAP layer 310 is deformed in the longitudinal direction. However, because the support structure 350 is provided on the outer edge of the EAP layer 310, the length of the thin active optical zoom lens is fixed, and thus the EAP layer 310 may be deformed into a curved shape in a region in which the support structure 350 is not present.

As shown in FIG. 6A, the lens structure body 335 may include the convex lens region without a thin film layer being formed over the EAP layer 310, and the lens region may be integrally formed with the EAP layer 310 using the same material. In the case where the thin active optical zoom lens is configured in this way, as shown in FIG. 6B, when the EAP layer 310 is deformed into a curved shape by applying a voltage to the EAP layer 310 in the thickness direction, it may be effective for offsetting a loss in the degree of deformation which may be caused due to the presence of the thin film layer over the EAP layer 310.

The curved-surface deformation of the EAP layer 310 may vary the vertical position of the lens structure 330, 335 formed on the central portion of the EAP layer 310. The degree to which the vertical position of the lens structure 330 is varies may be adjusted depending to an applied voltage and the diameter of the EAP layer 310. In more detail, a length variation of the EAP layer 310 depends on the applied voltage under conditions of a fixed thickness of the EAP layer 310. That is, since the thickness of the EAP layer 310 is a fixed value, it is possible to set the longitudinal variation of the EAP layer 310 depending on the magnitude of the applied voltage. In this case, the degree of the curved-surface deformation of the EAP layer 310, corresponding to a longitudinal variation in which the length of the EAP layer 310 increases, may be changed depending on the diameter of the EAP layer 310. Therefore, the degree of variation in vertical position of the lens structure 330, 335 formed on the central portion of the EAP layer 310 may be adjusted depending on a voltage applied to the EAP layer 310 and the diameter of the EAP layer 310. The degree of variation in vertical position of the lens structure 330, 335 depending on the applied voltage may be preset in the control circuit unit 360.

In some embodiments, the drive control circuit unit 360 may receive feedback on whether focusing has been succeeded while the position of the lens structure 330, 335 is varied by deformation of the EAP layer 310 that results from application of a voltage. The drive control circuit unit 360 may use received feedback information and control, that is, increase, reduce, or maintain, the voltage applied to the EAP layer 310 so as to focus on a desired target. In some embodiments, the drive control circuit unit 360 may control the deformation of the EAP layer 310 using the feedback information in order to secondarily perform fine focusing.

The lens structure 330, 335 formed on the upper surface of the EAP layer 310 may be designed such that it is made of a flexible dielectric polymer and may also function as an insulation layer in some embodiments. The insulation layer 340 formed on the lower surface of the EAP layer 310 may be made of the same material as that of the EAP layer 310 so as to prevent a reduction in the degree of deformation of the EAP layer 310. Alternatively, in some embodiments, the insulation layer 340 may be made of dielectric material having a lower stiffness than that of the material of the EAP layer 310.

FIG. 7A, FIG. 7B and FIG. 7C are views illustrating another example of the thin active optical zoom lens according to the first embodiment of the present disclosure. FIG. 8 is a view illustrating another example of the thin active optical zoom lens according to the second embodiment of the present disclosure.

As shown in FIG. 7A, the thin active optical zoom lens according to the first embodiment of the present disclosure may include an EAP layer 610, a first electrode 620 and a second electrode 625 which are respectively disposed on upper and lower surfaces of the EAP layer 610, and a lens structure 630 which is disposed over the EAP layer 610. An insulator (or an insulation layer) 640 may be disposed below the EAP layer 610 so as to prevent electric leakage of the electrodes 620 and 625. A support structure 650 may be disposed on an outer edge of the EAP layer 610 and function to support the thin active optical zoom lens.

The thin active optical zoom lens may further include thin film layers 670 and 675 for controlling the direction in which the position of the lens structure 630 varies. The upper thin film layer 670 and the lower thin film layer 675 may be respectively disposed in upper and lower ends of the thin active optical zoom lens. In some embodiments, only either the upper thin film layer 670 or the lower thin film layer 675 may be provided. In some embodiments, as shown in FIG. 7A, the upper thin film layer 670 and/or the lower thin film layer 675 may be respectively formed on only portions of the upper and lower ends of the thin active optical zoom lens. For example, the thin film layers 670 and 675 may be formed on portions of the upper and lower ends of the thin active optical zoom lens other than a portion corresponding to a convex lens region of the lens structure 630 that is disposed over the EAP layer 610. In some embodiments, the upper thin film layer 670 and the lower thin film layer 675 may be respectively formed on upper and lower surfaces of the support structure 650 at positions spaced apart from the lens structure 630 in a direction facing the lens region of the lens structure 630. In other words, the upper thin film layer 670 may be formed at a position spaced upward apart from an upper surface of the lens structure 630, and the lower thin film layer 675 may be formed at a position spaced downward apart from a lower surface of the lens structure 630.

Each of the thin film layers 670 and 675 may include a thin film layer electrode (unit). Thereby, when a voltage for deformation of the EAP layer is applied, either the upper thin film layer 670 or the lower thin film layer 675 may be selectively grounded.

As explained in the description of FIGS. 4A and 4B, a voltage may be applied to the EAP layer 610 in the thickness direction thereof through electrodes 620 and 625 that are respectively disposed on the upper and lower surfaces of the EAP layer 610. The application of a voltage to the EAP layer 610 may be performed by a drive control circuit unit 660. In other words, the drive control circuit unit 660 may apply a preset voltage to the EAP layer 610 through the electrodes 620 and 625 so as to deform the EAP layer 610.

In this case, referring to FIG. 7B, the drive control circuit unit 660 may apply a positive (+) voltage to the first electrode 620 and ground the second electrode 625.

As such, when a voltage is applied to the EAP layer 610, curved-surface deformation may be induced due to the support structure 650 provided on the outer surface of the EAP layer 610. In detail, when a voltage is applied to the EAP layer 610 in the thickness direction, the EAP layer 610 is deformed in the longitudinal direction. However, because the support structure 650 is provided on the outer edge of the EAP layer 610, the length of the thin active optical zoom lens is fixed, and thus the EAP layer 610 may be deformed into a curved shape in a region in which the support structure 650 is not present.

The curved-surface deformation of the EAP layer 610 may vary the vertical position of the lens structure 630 formed on the central portion of the EAP layer 610. Here, as shown in FIG. 7B, the upper thin film layer 670 may be grounded. In this case, electrostatic force may be generated between the upper thin film layer 670 and the first electrode 620 disposed on the upper surface of the EAP layer 610. That is, attractive force may be generated between the first electrode 620 and the upper thin film layer 670. Thereby, when the EAP layer 610 is deformed into a curved shape, the first electrode 620 may apply the attractive force to the EAP layer 610 upward. Therefore, the EAP layer 610 may be controlled such that it is deformed toward the upper thin film layer 670 that is disposed in the upper end of the thin active optical zoom lens at a position spaced apart from the EAP layer 610. Moreover, under the same applied voltage, the degree of variation in position of the lens structure 630 may be increased.

Although not shown, when a positive (+) voltage is applied to the first electrode 620 while the second electrode 625 is grounded, the lower thin film layer 675 may also be grounded. In this case, repulsive force may be generated between the lower thin film layer 675 and the second electrode 625. Thereby, when the EAP layer 610 is deformed into a curved shape, the second electrode 625 may apply the repulsive force to the EAP layer 610 upward. Thereby, the EAP layer 610 may be controlled such that it is deformed in a direction away from the lower thin film layer 675 that is disposed in the lower end of the thin active optical zoom lens at a position spaced apart from the EAP layer 610.

Referring to FIG. 7C, the drive control circuit unit 660 may ground the first electrode 620 and apply a positive (+) voltage to the second electrode 625. As such, when a voltage is applied to the EAP layer 610, curved-surface deformation may be induced due to the support structure 650 provided on the outer surface of the EAP layer 610. Here, the lower thin film layer 675 may be grounded. In this case, electrostatic force may be generated between the lower thin film layer 675 and the second electrode 625 disposed on the lower surface of the EAP layer 610. That is, attractive force may be generated between the second electrode 625 and the lower thin film layer 675. Thereby, when the EAP layer 610 is deformed into a curved shape, the second electrode 625 may apply the attractive force to the EAP layer 610 downward. Thereby, the EAP layer 610 may be controlled such that it is deformed toward the lower thin film layer 675 that is disposed in the lower end of the thin active optical zoom lens at a position spaced apart from the EAP layer 610.

Although not shown, when the first electrode 620 is grounded while a positive (+) voltage is applied to the second electrode 625, the upper thin film layer 670 may also be grounded. In this case, repulsive force may be generated between the upper thin film layer 670 and the first electrode 620. Thereby, when the EAP layer 610 is deformed into a curved shape, the first electrode 620 may apply the repulsive force to the EAP layer 610 downward. Thereby, the EAP layer 610 may be controlled such that it is deformed in a direction away from the upper thin film layer 670 that is disposed in the upper end of the thin active optical zoom lens at a position spaced apart from the EAP layer 610.

Figure 8A:
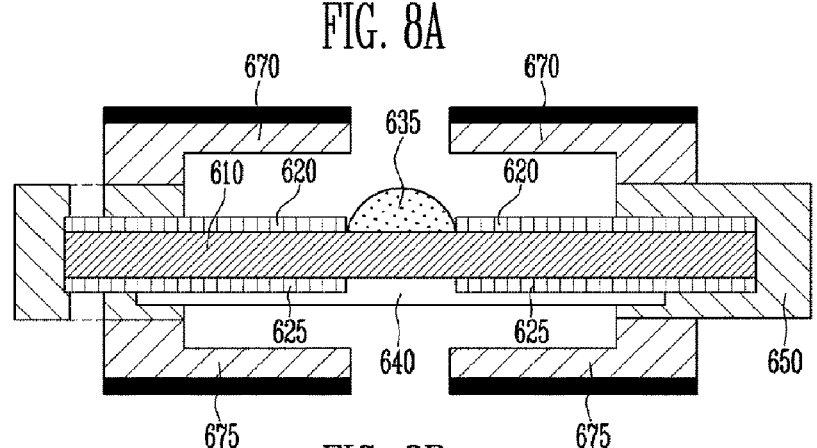
FIG. 8A, FIG. 8B and FIG. 8C are views illustrating another example of the thin active optical zoom lens according to the second embodiment of the present disclosure.
Figure 8B:
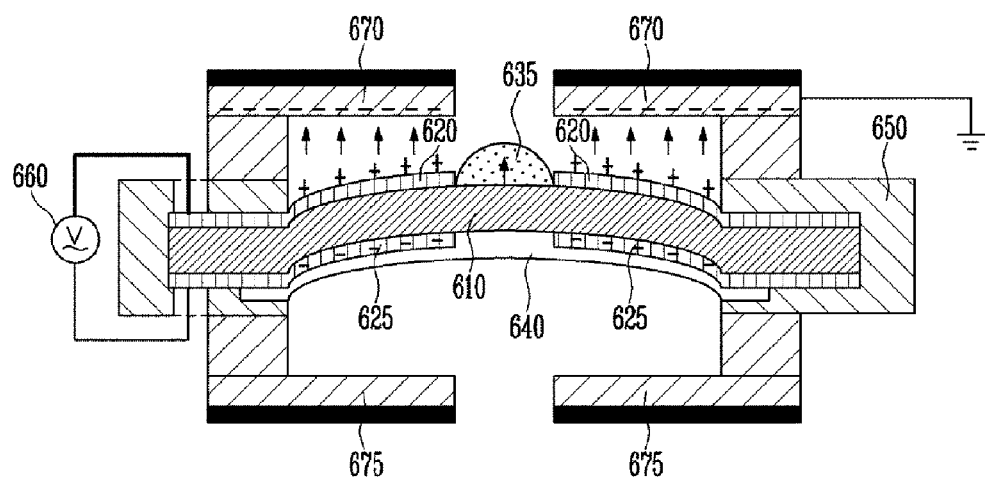
Figure 8C:
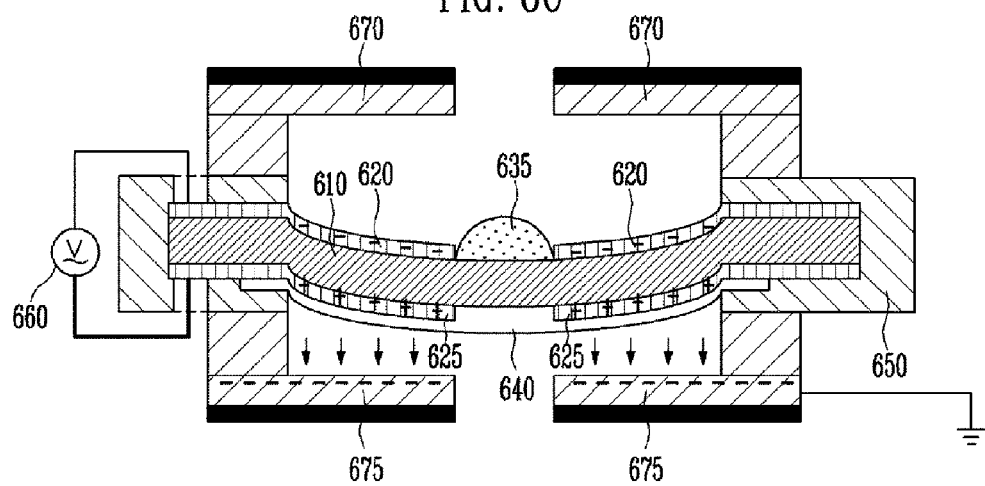

FIG. 8A, FIG. 8B and FIG. 8C are views illustrating another example of the thin active optical zoom lens according to the second embodiment of the present disclosure. The active optical zoom lens structure illustrated in FIGS. 3 6A and 6B may further include thin film layers 670 and 675 for controlling the direction in which the position of the lens region (lens structure) 635 varies. That is, the upper thin film layer 670 and the lower thin film layer 675 may be respectively disposed in upper and lower ends of the thin active optical zoom lens. In a manner similar to the operation principle that has been illustrated in detail in the description related to the embodiment of FIGS. 8A, 8B and 8C, when the EAP layer is deformed into a curved shape, it is possible to control the direction in which the vertical position of the lens structure 635 varies and to increase the degree of variation in position of the lens structure 635. In addition, the present example is effective for offsetting a loss in the degree of deformation which may be caused due to the presence of the thin film layer of the lens structure body formed on the upper surface of the EAP layer 610. Thus, the degree of variation in the position may be additionally increased. Furthermore, in the present example, the lens structure body 635 does not have a thin film layer formed over the EAP layer 610. Hence, when a positive (+) voltage is applied to the first electrode 620 while the second electrode 625 and the upper thin film layer 670 are grounded, electrostatic force may be effectively generated between the upper thin film layer 670 and the first electrode 620. As a result, an increase in the degree of variation in position may be expected. Furthermore, even when first electrode 620 is ground while the second electrode 625 is applied with a positive (+) voltage and the lower thin film layer 675 is grounded, the same effects may be expected.

As illustrated in the description of FIGS. 5A to 6B, the degree of variation in vertical position of the lens structure 630, 635 may be adjusted depending on an applied voltage and the diameter of the EAP layer 610. Furthermore, electrostatic force generated between the first electrode 620 and the upper thin film layer 670 and/or between the second electrode 625 and the lower thin film layer 675 may increase the degree of deformation of the EAP layer 610. Therefore, the thin film layers 670 and 675, using electrostatic force between them and the first and second electrodes 620 and 625, may not only control the direction in which the position of the lens structure 630, 635 varies but may also increase the degree to which the vertical position of the lens structure 630, 635 varies.

The thin film layers 670 and 675 may be made of insulation material that has high stiffness so as to prevent the thin film layers 670 and 675 from being deformed toward the EAP layer due to electrostatic force. For example, each of the thin film layers 670 and 675 may be formed of a glass plate, an acryl plate, or a high-strength plastic plate, but it is not limited thereto.

In some embodiments, the electrodes of the thin film layers 670 and 675 may be made of conductive material having low light transmittance. In this case, scattering of light passing through the lens structure 630, 635 is prevented. Therefore, in an optical system embodied using the active optical zoom lens, a loss of light quantity required to capture an image of the target may be prevented. The electrodes of the thin film layers 670 and 675 may be made of metal nanomaterial or carbon nanotube that is based on nanomaterial capable of reducing the light transmittance, or a conductive composite material formed by complexation of rubbers, but it is not limited thereto.

Figure 9A:
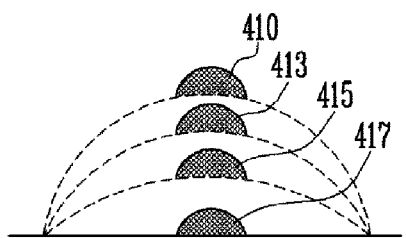
FIG. 9A and FIG. 9B are views illustrating an example of automatic focusing realized by controlling variation in position of the lens structure according to an embodiment of the present disclosure.
Figure 9B:
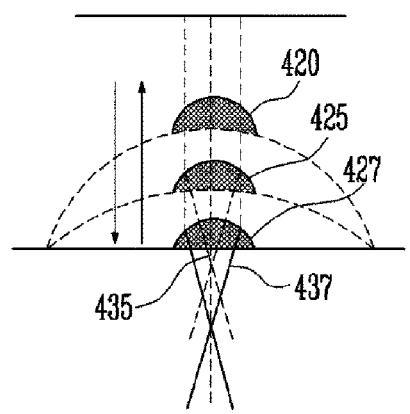

FIG. 9A and FIG. 9B are views illustrating an example of automatic focusing realized by controlling variation in position of the lens structure according to an embodiment of the present disclosure.

Referring to FIGS. 2 to 9B, the degree of deformation of the EAP layer 110, 310, 610 may be adjusted according to an applied voltage signal, and high-speed deformation thereof may also be embodied. When the applied voltage is removed, the EAP layer 110, 310, 610 can be elastically restored. Therefore, reversible position variation of the lens structure 130, 330, 335, 630, 635 using the EAP layer 110, 310, 610 can be embodied by selectively controlling the position of the lens structure 130, 330, 335, 630, 635.

For example, depending on variation in voltage signal applied to the EAP layer 110, 310, 610, the position of the lens structure 130, 330, 335, 630, 635 may be changed to a position 410, 413, 415, or 417, as shown in FIG. 9A. That is, when the magnitude of a voltage applied to the EAP layer 110, 310, 610 is relatively large, the degree to which the EAP layer 110, 310, 610 is deformed is also large, as shown by the position 410. Consequently, the degree to which the position of the lens structure is moved upward is also large. When the magnitude of an applied voltage is smaller than that of the above case, the degree to which the position of the lens structure is varied is reduced, as shown by the position 413. When the applied voltage is removed, the lens structure is returned to its original state, as shown by the position 417, by the elastic restoring force of the EAP layer 110, 310, 610.

When using this, as shown in FIG. 9B, the active optical zoom lens according to an embodiment of the present disclosure may be applied to an optical system for a high-speed automatic focusing function required to rapidly obtain a high-resolution image of a target. That is, as the voltage applied to the EAP layer 110, 310, 610 varies, the position of the lens structure may be successively changed, as shown by the positions 420, 425, 427, etc. of FIG. 9B. With regard to the focus of the lens structure, when the lens structure is located at the position 425, the focus may be formed as indicated by reference numeral 435, and when the lens structure is located at the position 427, the focus may be formed as indicated by reference numeral 437. Using such characteristics, the control circuit unit 160, 360, 660 may control the magnitude of a voltage applied to the EAP layer 110, 310, 610 so that focusing on a target can be embodied by varying the position of the lens structure to capture a high-resolution image of the target.

Figure 10:
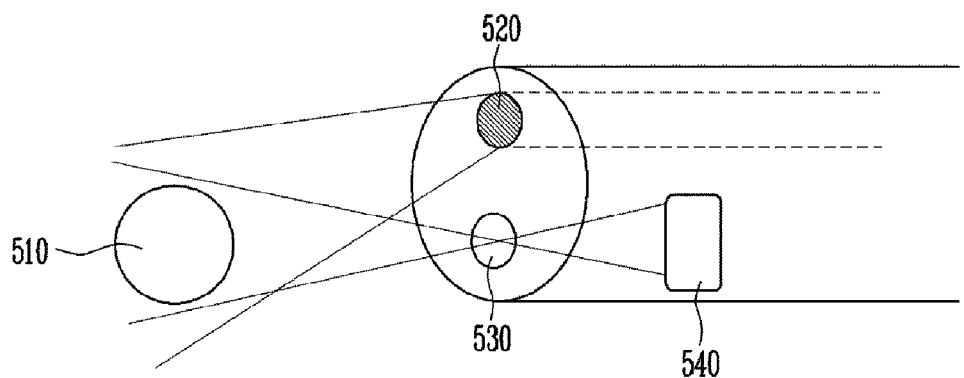
FIG. 10 is a view illustrating an example of an optical system for an endoscope using a thin active optical zoom lens according to an embodiment of the present disclosure.

FIG. 10 is a view illustrating an example of an optical system for an endoscope using a thin active optical zoom lens according to an embodiment of the present disclosure.

As explained in the description of FIGS. 1 to 9B, an active optical zoom lens according to an embodiment of the present disclosure is able to conduct a high-speed automatic focusing function using reversible variation of the lens structure. Therefore, the active optical zoom lens makes a reduction in size possible. Thereby, the active optical zoom lens or an optical system using the active optical zoom lens may be used in an imaging apparatus for disease diagnosis. For example, as shown in FIG. 10, the active optical zoom lens according to the embodiment of the present disclosure may be used in an endoscope.

Referring to FIG. 10, an endoscope for capturing an image of a target 510 such as a specific portion of a human body may include a light source 520, a lens unit 530, and a CCD image sensor 540. The lens unit 530 may be a lens for endoscopes or an optical system for endoscopes. The active optical zoom lens according to the embodiment of the present disclosure may be used as the lens unit 530. Thus, the lens unit 530 may be used to capture high-resolution images at high speed on a path in the human body along which observation using the endoscope is made. That is, in the lens unit 530, as the position of the lens structure body on the EAP layer is changed by varying the voltage applied to the EAP layer, focusing on the target 510 is implemented. Detailed operation of the lens unit 530 is as explained in the description of FIGS. 1 to 9B; therefore, further explanation will be omitted. The endoscope using the active optical zoom lens according to the embodiment of the present disclosure is able to capture high-resolution images at high speed, thus making it possible to enhance the accuracy of diagnosis of a disease.

Although, in FIG. 10, the endoscope has been illustrated as an example of an apparatus using the active optical zoom lens according to the embodiment of the present disclosure, it is not limited thereto. For instance, the active optical zoom lens according to the embodiment of the present disclosure may be used in various apparatuses such as a camera, a portable terminal, a projector, a TV, and the like.

As described above, various embodiments of the present disclosure provide a thin active optical zoom lens technique which has a structure of a combination of a polymer lens structure body and an electro-active polymer actuator, and is able to embody active variation in position of the polymer lens structure body and control therefor using deformation of an electro-active polymer layer by an electric signal.

Furthermore, according to various embodiments of the present disclosure, the position of the polymer lens structure body can be actively changed, whereby a zoom in/out function can be embodied without interlocking with a separate linear drive unit.

In addition, various embodiments of the present disclosure provide a thin active optical zoom lens capable of actively changing the position of the polymer lens structure body, and thus reducing a loss of light quantity.

Various embodiments of the present disclosure provide an optical zoom lens configured such that the position of the lens structure body is actively changed by controlling an electric signal applied to a thin electro-active polymer layer, and an optical system based on the same.

Furthermore, an actively controllable thin optical zoom module can be installed in an apparatus such as a camera, a portable terminal, a projector, a TV or the like, thus making it possible to reduce the thickness and weight of the apparatus.

Various embodiments of the present disclosure provide a thin active optical zoom lens which can be used in optical systems of various optical apparatuses such as an optical property measurement apparatus or an optical imaging apparatus, e.g., a confocal microscope.

Furthermore, according to embodiments of the present disclosure, in a medical imaging test using a medical imaging apparatus, e.g., an endoscope, a high-resolution image can be obtained by an active optical zoom function and its feedback control, thus making it possible to enhance the accuracy of diagnosis of a disease.

The effects of the present disclosure are not limited to the above-mentioned effects, and those skilled in this art will be able to easily understand other unmentioned effects from the following description.

The embodiments disclosed in the present specification and the drawings just aims to help those with ordinary knowledge in this art more clearly understand the present disclosure rather than aim1ng to limit the bounds of the present disclosure. Therefore, one of ordinary skill in the art to which the present disclosure belongs will be able to easily understand that various modifications are possible based on the technical scope of the present disclosure.

Although exemplary embodiments of the present disclosure have been described in detail hereinabove with specific terminology, this is for the purpose of describing particular embodiments only and not intended to be limiting of the disclosure. While particular embodiments of the present disclosure have been illustrated and described, it would be obvious to those skilled in the art that various other changes and modifications can be made without departing from the spirit and scope of the disclosure.

What is claimed is:

1. An optical zoom lens comprising:
   an electro-active polymer layer configured to be deformable in response to an electric signal;
   a lens structure formed over the electro-active polymer layer;
   a first electrode formed on an upper surface of the electro-active polymer layer;
   a second electrode formed on a lower surface of the electro-active polymer layer; and
   a control circuit unit configured to control application of a voltage to the first electrode and the second electrode.

2. The optical zoom lens according to claim 1, further comprising:
   an insulator formed below the second electrode; and
   a support structure provided on an outer edge of the electro-active polymer layer.

3. The optical zoom lens according to claim 2, wherein the insulator is made of the same kind of material as the electro-active polymer layer or a material having a stiffness lower than the electro-active polymer layer.

4. The optical zoom lens according to claim 1, wherein the first electrode and the second electrode are respectively formed on only portions of the upper and lower surfaces of the electro-active polymer layer.

5. The optical zoom lens according to claim 1, wherein the electro-active polymer layer includes an electro-active material having reversible deformation response characteristics to the electric signal.

6. The optical zoom lens according to claim 1, wherein the zoom lens is for carrying out a focusing operation, and wherein the control circuit unit receives a feedback on whether the focusing operation has been succeeded as the electro-active polymer layer is deformed in response to an applied voltage.

7. The optical zoom lens according to claim 6, wherein the control circuit unit changes or maintains a magnitude of the applied voltage using the received feedback information so as to control the focusing.

8. The optical zoom lens according to claim 1, wherein the lens structure includes a dielectric polymer material.

9. The optical zoom lens according to claim 1, further comprising:
   an upper thin film layer formed over the first electrode at a position spaced apart from the first electrode; and
   a lower thin film layer formed below the second electrode at a position spaced apart from the second electrode,
   wherein at least either the upper thin film layer or the lower thin film layer includes a thin film layer electrode.

10. The optical zoom lens according to claim 9, wherein when the first electrode is applied with a positive (+) voltage and the second electrode is grounded, the upper thin film layer is grounded.

11. The optical zoom lens according to claim 1, wherein the lens structure includes a lens region, and a thin film layer formed over the electro-active polymer layer, and the first electrode is formed between the electro-active polymer layer and the thin film layer.

12. An optical apparatus comprising:
    at least two optical zoom lenses; and
    a charge coupled device (CCD),
    wherein each of the at least two optical zoom lenses comprises:
    an electro-active polymer layer configured to be deformable in response to an electric signal;
    a lens structure formed over the electro-active polymer layer;
    a first electrode formed on an upper surface of the electro-active polymer layer;
    a second electrode formed on a lower surface of the electro-active polymer layer; and
    a control circuit unit configured to apply a voltage to the first electrode and the second electrode.

13. The optical apparatus according to claim 12, wherein the at least two optical zoom lenses further comprises:
    a first optical zoom lens including a convex-lens-shaped lens structure; and
    a second optical zoom lens including a concave-lens-shaped lens structure.

14. The optical apparatus according to claim 12, wherein each of the at least two optical zoom lenses further comprises:
    an upper thin film layer formed over the first electrode at a position spaced apart from the first electrode; and
    a lower thin film layer formed below the second electrode at a position spaced apart from the second electrode,
    wherein at least either the upper thin film layer or the lower thin film layer includes a thin film layer electrode.

15. The optical apparatus according to claim 12, wherein: the lens structure includes a lens region, and a thin film layer formed over the electro-active polymer layer; and the first electrode is formed between the electro-active polymer layer and the thin film layer.

* * * * *